UNITED STATES PATENT OFFICE.

HENRY WILLIAM COUPE ANNABLE, OF EGHAM, ENGLAND, ASSIGNOR TO NICKEL CONCENTRATION LIMITED, OF LONDON, ENGLAND.

EXTRACTION OF NICKEL FROM SILICATE ORES.

1,289,072. Specification of Letters Patent. Patented Dec. 31, 1918.

No Drawing. Application filed May 15, 1917. Serial No. 168,850.

*To all whom it may concern:*

Be it known that I, HENRY WILLIAM COUPE ANNABLE, a subject of the King of England, residing at Egham, Surrey, England, have invented certain new and useful Improvements in the Extraction of Nickel from Silicate Ores, of which the following is a specification.

This invention is for improvements in or relating to the extraction of nickel from silicate ores, such as garnierite.

It is usual to treat such ores by smelting them with the addition of materials containing sulphur, such as calcium sulfid, so as to convert the nickel silicate to nickel sulfid, which is thereafter converted into nickel oxid by roasting, or calcium sulfate and coal may be employed instead of calcium sulfid, whereby calcium sulfid is produced during the operation of smelting.

According to the present invention in a process for the extraction of nickel from a silicate ore, such as garnierite, the nickel silicate is converted to nickel sulfid by heating the ore in a furnace in the presence of moist sulfureted hydrogen and preferably a small quantity of sodium salt, such as sodium chlorid, or a potassium salt.

Among the salts with which successful results have been obtained are sodium chlorid, sodium carbonate, sodium sulfate, potassium chlorid, potassium carbonate and potassium sulfate. When sodium chlorid is employed it may, if desired, be added in the form of sea-water.

By this means it is found that a very large percentage of the nickel is converted into sulfid.

The present invention is preferably carried out by mixing with the ore a quantity of a sulfur-yielding substance, such as iron pyrites or copper pyrites, adding a small quantity of chlorid, carbonate or sulfate of sodium or potassium, and then heating it in a furnace to a temperature of from 250° to 1000° C., at the same time passing a current of steam through the furnace. When a carbonate is employed, sulfur may be mixed with the ore in place of iron or copper pyrites, and the term "sulfur-yielding substance" is intended to cover sulfur.

One method of carrying this invention into effect will now be described.

Garnierite ore is ground to say 60 mesh, and is then intimately mixed with iron pyrites and with common salt. The mixture is introduced into a furnace, where it is heated to from 250° to 1000° C., steam is passed at the same time into the furnace and air being excluded. The best results are obtained by maintaining the temperature at from 650° to 800° C. The following equation represents the final products obtained as the result of the reaction which takes place in the furnace:—

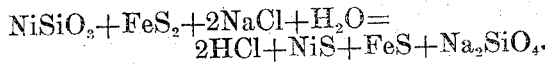

$$NiSiO_3 + FeS_2 + 2NaCl + H_2O = 2HCl + NiS + FeS + Na_2SiO_4.$$

When the reaction in the furnace is completed the resultant mass containing both sulfids of iron and of nickel is heated in the atmosphere to a temeprature necessary to oxidize the sulfids to sulfates, and also at the same time to decompose the sulfate of iron formed but not the sulfate of nickel. The hot mass is discharged into water, and the sulfate of nickel dissolved, care being taken to prevent the temperature of the water from rising to say more than 30° C., since as the temperature increases the amount of nickel soluble in the water decreases rapidly. In certain cases a basic sulfate of nickel is formed when nickel sulfid is heated in the atmosphere, and in such a case the basic sulfate may be dissolved by adding hydrochloric acid to the water. This hydrochloric acid may be obtained from the gases emitted from the furnace in which the ore is heated with iron pyrites and salt in a current of steam.

The nickel may be recovered from the solution in water in several ways. After separation of the solid material, such as by filtration, the nickel may be precipitated as carbonate, as for example by adding magnesite, or as sulfid by the addition of sodium sulfid. Or the gases from the furnace may be passed into the nickel solution, whereupon the nickel is precipitated by the sulfurated hdyrogen, in which case the hydrochloric acid may be first removed from the gases, or the furnace gases may be passed direct into the nickel solutions, in which case a quantity of calcium carbonate more than sufficient to neutralize the acid is suspended in the said solutions. If the hydrochloric acid is first removed from the gases before they are passed into the nickel solutions the latter should be first neutralized, as for example by the addition of a small quantity of chalk.

The precipitated salt of nickel is dried and heated in the atmosphere for the formation of nickel oxid which is found to carry approximately 90% of nickel oxid.

Similarly when the nickel is precipitated as carbonate, the precipitate is separated from the liquid as by filtering, and is dried and ignited to form nickel oxid.

When, according to the present invention, garnierite ore is heated in the presence of moist sulfureted hydrogen and a small quantity of one of the salts mentioned above, the whole of the nickel is found to be attached and converted into sulfid.

It has also been found that if the mixture of ground ore and pyrites is first heated and then salt is added to the furnaced product and the mixture then oxidized, the amount of soluble nickel obtained is far below that obtained by the process described above.

Some of the magnesium in the ore is converted into magnesium sulfate during the process.

What I claim as my invention and desire to secure by Letters Patent is:—

1. In a process for the extraction of nickel from a silicate ore, the step which consists in heating the ore in a furnace in the presence of moist sulfureted hydrogen to convert the nickel silicate to nickel sulfid.

2. In a process for the extraction of nickel from a silicate ore, the step which consists in heating the ore in a furnace in the presence of moist sulfureted hydrogen and a small quantity of a salt of an alkali metal to convert the nickel silicate to nickel sulfid.

3. In a process for the extraction of nickel from a silicate ore, the step which consists in heating the ore mixed with a sulfidized substance in the presence of steam to convert the nickel silicate to nickel sulfid.

4. In a process for the extraction of nickel from a silicate ore, the step which consists in heating the ore mixed with a sulfidized substance in the presence of steam and a small quantity of a salt of an alkali metal to convert the nickel silicate to nickel sulfid.

5. In a process for the extraction of nickel from a silicate ore, the step which consists in heating the ore having mixed with it sea-water in a furnace in the presence of moist sulfureted hydrogen to convert the nickel silicate to nickel sulfid.

6. In a process for the extraction of nickel from a silicate ore, heating the ore in a furnace in the presence of moist sulfureted hydrogen and a small quantity of a chlorid of an alkali metal to convert the nickel silicate to nickel sulfid, oxidizing the nickel sulfid to nickel sulfate and dissolving any basic nickel sulfate formed with hydrochloric acid collected from the furnace gases.

7. In a process for the extraction of nickel from garnierite ore, the step which consists in heating the ore in a furnace in the presence of moist sulfureted hydrogen to convert the nickel silicate to nickel sulfid.

8. In a process for the extraction of nickel from garnierite ore, the step which consists in heating the ore in a furnace with iron pyrites in the presence of steam to convert the nickel silicate to nickel sulfid.

9. In a process for the extraction of nickel from garnierite ore, the step which consists in heating the ore in a furnace in the presence of moist sulfureted hydrogen and a small quantity of sodium chlorid, to convert the nickel silicate to nickel sulfid.

10. In a process for the extraction of nickel from garnierite ore, the step which consists in heating the ore in a furnace in the presence of moist sulfureted hydrogen and a small quantity of sea-water, to convert the nickel silicate to nickel sulfid.

11. In a process for the extraction of nickel from garnierite ore, heating the ore in a furnace in the presence of moist sulfureted hydrogen and a small quantity of sodium chlorid to convert the nickel silicate to nickel sulfate, oxidizing the nickel sulfid to convert it to nickel sulfate, collecting the hydrochloric acid from the furnace gases and dissolving therewith any basic nickel sulfate formed.

In testimony whereof I have signed my name to this specification in the presence of two subscribing witnesses.

HENRY WILLIAM COUPE ANNABLE.

Witnesses:
HAROLD H. SIMMONS,
ERNEST W. MOSS.

Copies of this patent may be obtained for five cents each, by addressing the "Commissioner of Patents, Washington, D. C."